US008565730B2

(12) United States Patent
Vanderveen et al.

(10) Patent No.: US 8,565,730 B2
(45) Date of Patent: Oct. 22, 2013

(54) USER INTERFACE FOR CONFIGURING SERVICE ACCOUNT-SPECIFIC USER NOTIFICATIONS FOR INBOUND ELECTRONIC MESSAGES

(75) Inventors: Raymond Paul Vanderveen, Waterloo (CA); Gerhard Dietrich Klassen, Waterloo (CA)

(73) Assignee: Blackberry Limited, Waterloo (CA)

( * ) Notice: Subject to any disclaimer, the term of this patent is extended or adjusted under 35 U.S.C. 154(b) by 980 days.

(21) Appl. No.: 12/142,252

(22) Filed: Jun. 19, 2008

(65) Prior Publication Data

US 2009/0318172 A1    Dec. 24, 2009

(51) Int. Cl.
*H04M 1/663* (2006.01)

(52) U.S. Cl.
USPC ............... 455/412.2; 455/412.1; 455/414.1; 455/415; 455/466

(58) Field of Classification Search
USPC ................ 455/412.1–415, 466, 566–567; 340/384.1, 384.4
See application file for complete search history.

(56) References Cited

U.S. PATENT DOCUMENTS

| | | | |
|---|---|---|---|
| 5,365,227 A * | 11/1994 | Cannon et al. | 340/7.54 |
| 6,489,977 B2 * | 12/2002 | Sone | 715/835 |
| 7,430,409 B2 | 9/2008 | Klassen et al. | |
| 2004/0253993 A1 * | 12/2004 | Nakamura | 455/567 |
| 2006/0009243 A1 | 1/2006 | Dahan et al. | |
| 2006/0143298 A1 * | 6/2006 | Anttila et al. | 709/227 |
| 2007/0088786 A1 | 4/2007 | Hardy et al. | |
| 2008/0207188 A1 * | 8/2008 | Ahn et al. | 455/418 |
| 2009/0061910 A1 * | 3/2009 | Garba | 455/466 |
| 2009/0182824 A1 * | 7/2009 | Haynes et al. | 709/206 |
| 2010/0124215 A1 * | 5/2010 | Haitani et al. | 455/415 |
| 2012/0106725 A1 * | 5/2012 | Smith et al. | 379/201.02 |
| 2012/0117507 A1 * | 5/2012 | Tseng et al. | 715/774 |

FOREIGN PATENT DOCUMENTS

EP    1775924 A1    4/2007

OTHER PUBLICATIONS

Huang, Ning. Canadian Intellectual Property Office Examiner's Report dated Dec. 21, 2011, in relation to Canadian Patent Application No. 2,665,457, 2 pages.

* cited by examiner

*Primary Examiner* — Dai A Phuong

(57) ABSTRACT

To facilitate configuration of a communication device capable of receiving electronic messages via a plurality of service accounts, a user interface element is displayed. The user interface element represents an electronic message received via a service account of the plurality of service accounts or a field of the electronic message, such as a field containing a service account identifier. Upon user selection of the user interface element and one of a plurality of user notifications, the electronic device is configured to provide the selected user notification upon receipt of an electronic message via that service account.

17 Claims, 11 Drawing Sheets

USER INTERFACE FOR CONFIGURING SERVICE ACCOUNT-SPECIFIC USER NOTIFICATIONS FOR INBOUND ELECTRONIC MESSAGES

FIELD OF TECHNOLOGY

The present disclosure pertains to electronic messaging, and more particularly to user interfaces for configuring service account-specific user notifications for inbound electronic messages.

BACKGROUND

Electronic messaging, such as the sending of electronic mail (email) messages, instant messages, Short Messaging Service (SMS) messages and/or Multimedia Messaging Service (MMS) messages for example, has become ubiquitous. Many types of communication devices, such as computers (e.g. desktop, laptop or palmtop machines) and wireless communication devices (e.g. two-way paging devices, personal digital assistants (PDAs), cellular telephones, and smart phones)—also known as "mobile communication devices" or simply "mobile devices"—are equipped with electronic messaging capabilities. A communication device may permit its user to access multiple electronic messaging service accounts (also referred to simply as "service accounts" or "accounts"). These may include multiple email accounts, multiple instant messaging accounts, and multiple telephone numbers (e.g. a work number as well as a personal number) supporting SMS and/or MMS that the communication device is configured to receive, or other types of accounts. The user of such a communication device may receive a steady stream of electronic messages of various types (emails, instant messages, text messages, multimedia messages, etc.), possibly including work-related messages, personal messages, and other categories of messages. It may be difficult for a user to effectively configure the device to keep abreast of this steady stream of inbound electronic message traffic.

BRIEF DESCRIPTION OF DRAWINGS

In the figures which illustrate at least one example embodiment.

DETAILED DESCRIPTION

In one aspect of the below described embodiment, there is provided a method of configuring an electronic device capable of receiving electronic messages via a plurality of service accounts, comprising: displaying a user interface element representing: an electronic message received via a service account of said plurality of service accounts; or a field of the electronic message; and upon user selection of the user interface element and one of a plurality of user notifications, configuring said electronic device to provide the selected user notification upon receipt of a subsequent electronic message via said service account.

In another aspect of the below described embodiment, there is provided a machine-readable medium storing instructions which, when executed by a processor of an electronic device capable of receiving electronic messages via a plurality of service accounts, cause said electronic device to: display a user interface element representing: an electronic message received via a service account of said plurality of service accounts; or a field of the electronic message; and upon user selection of the user interface element and one of a plurality of user notifications, configure said electronic device to provide the selected user notification upon receipt of a subsequent electronic message via said service account.

In yet another aspect of the below described embodiment, there is provided an electronic device capable of receiving electronic messages via a plurality of service accounts, said electronic device comprising a processor and memory in communication with said processor, said memory storing machine-readable medium storing instructions which, when executed by said processor, cause said electronic device to: display a user interface element representing: an electronic message received via a service account of said plurality of service accounts; or a field of the electronic message; and upon user selection of the user interface element and one of a plurality of user notifications, configure said electronic device to provide the selected user notification upon receipt of a subsequent electronic message via said service account.

Figure 1:
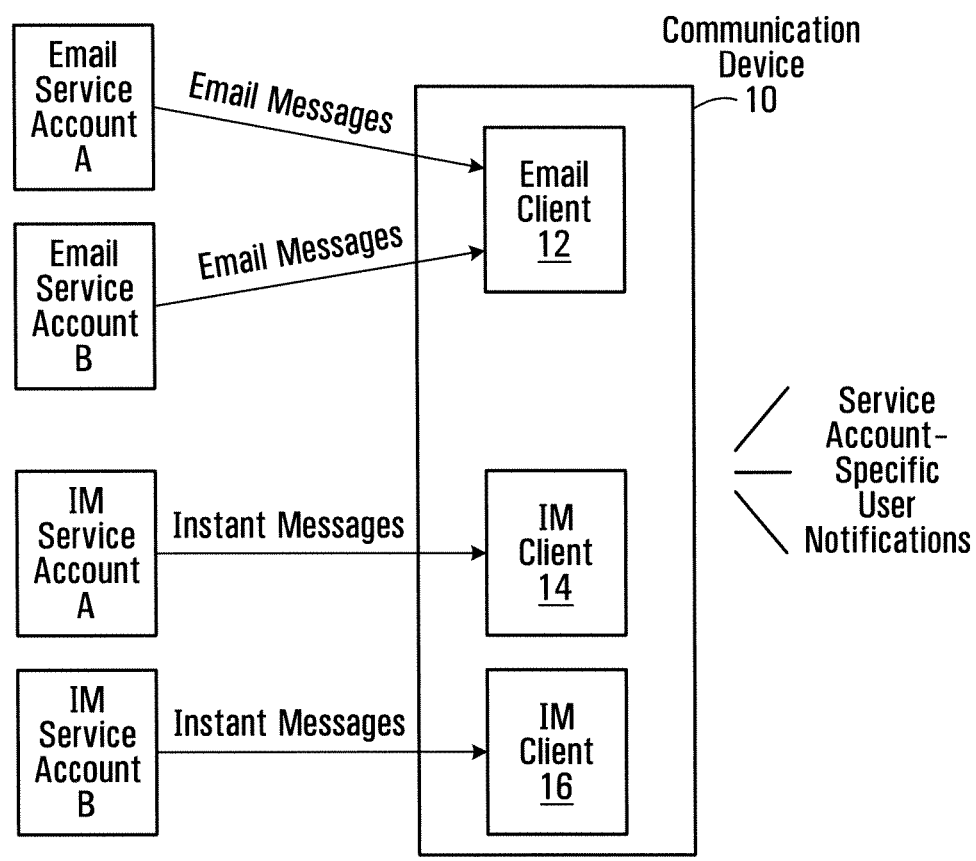
FIG. 1 is a schematic diagram illustrating an exemplary communication device.

With reference to FIG. 1, an exemplary communication device 10 (a form of electronic device) permits its user to access multiple email service accounts (or simply "email accounts") and multiple instant messaging (IM) service accounts ("IM accounts"), both forms of service accounts for receiving electronic messages. In particular, the device 10 is configured to receive email messages from an email account A and an email account B as well as two IM accounts A and B. A known redirection service may, for example, be used to "collect" email messages from other or both of the accounts for forwarding to the device. An email client software application ("email client") 12 at the device 10 may display received email messages, e.g. in a user interface (UI) that includes a unified email message list which intermingles email messages from accounts A and B. In the case of the two IM accounts A and B, each account in the illustrated example is associated with a distinct IM service provider. Upon registration with each provider, the device 10 may be provisioned with an IM client software application ("IM client") 14 and 16, respectively. The device 10 may thus be configured to display instant messages received via IM service account A using IM client 14 and to display instant messages received via IM service account B using IM client 16 (the latter being illustrative of the fact that electronic messages received from multiple service accounts can be displayed at the device 10 by a single client software application or by multiple client software applications).

In overview, a user interface is provided for conveniently configuring device 10 to provide user notifications on a service account-specific basis. A user interacting with the device 10 is able to select a UI element, which may for example be a textual element or field, a graphical element or set of elements, or some other form of user interface construct, that represents an electronic message received by way of a particular service account or a field of that message. The UI element may for example be an entry representing the message in an "inbox" or a textual field of a displayed message that indicates the service account via which the message was received (e.g. a "Service:", "Received using:" or "Account:" field within a header portion of the message). In addition to selecting the user interface element, the user selects a user notification to be provided upon receipt of an electronic message via that service account. A user interface control such as a drop-down list, set of radio buttons or the like, permitting user selection of one of a number of user notifications, may be used for this purpose. The user notifications may be audible notifications such as ringtones, visual notifications such as a flashing LED or image to be displayed, tactile notifications such as vibration patterns, or combinations of these. Upon user selection of one of the user notifications, the electronic device is configured to provide the selected user notification upon receipt of an electronic message via that service account. Configuration is performed even if the user is unaware, or only marginally aware, of the identity of the service account via which the message was received.

Figure 2:
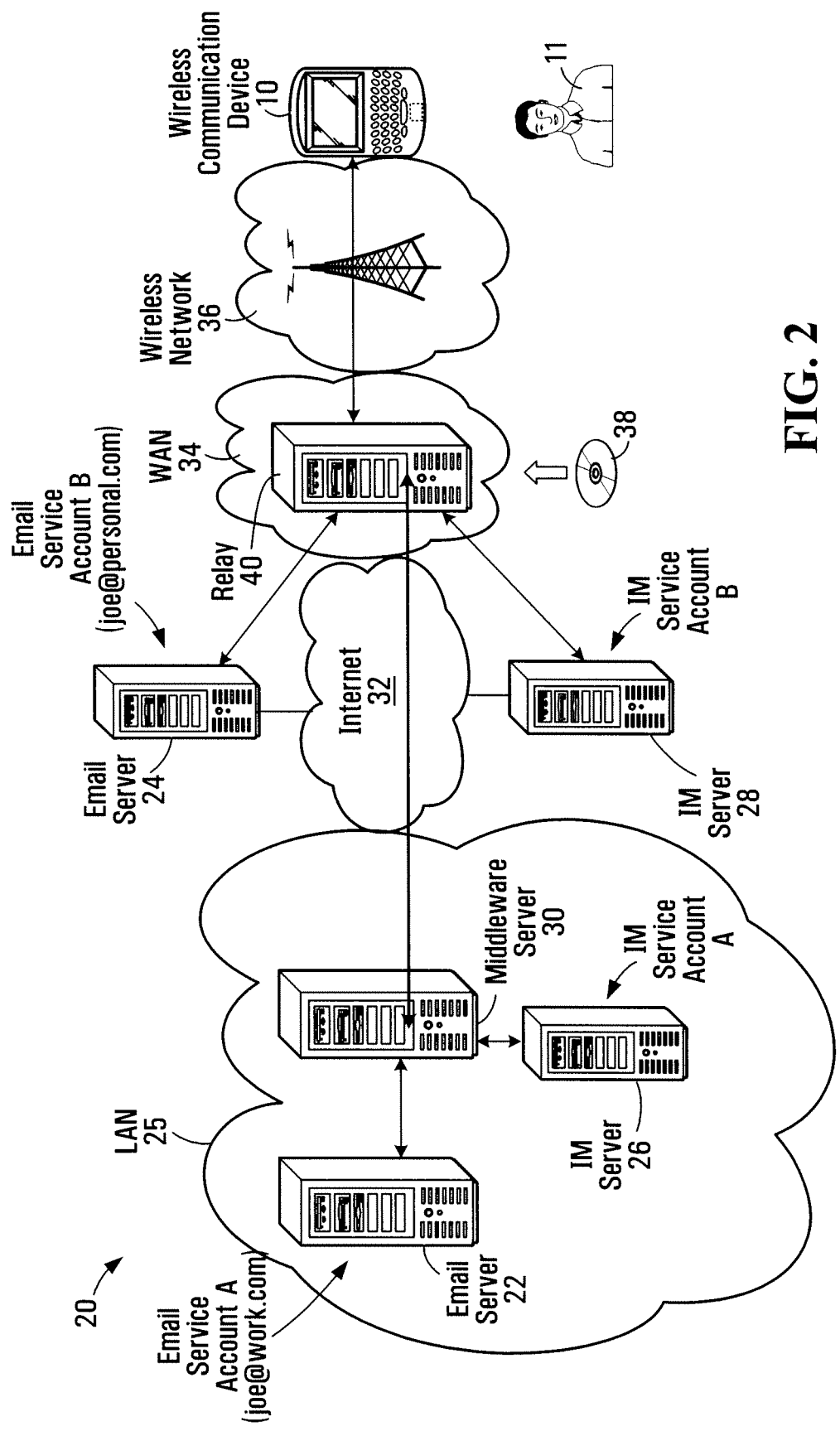
FIG. 2 is a schematic diagram illustrating the exemplary communication device of FIG. 1 in the context of an exemplary system.

Referring to FIG. 2, an exemplary system 20 that is capable of communicating electronic messages received via multiple service accounts to communication device 10 is shown. In the illustrated embodiment, the communication device 10 is a wireless communication device, and the electronic messages are email messages and instant messages. As shown in FIG. 2, the system 20 includes two email servers 22, 24, two IM servers 26, 28, a middleware server 30, the public Internet 32, a wide area network (WAN) 34, and a wireless network 36, in addition to communication device 10.

The exemplary wireless communication device 10 of FIG. 2 is a two-way paging device capable of displaying a UI for conveniently configuring the device to provide user notifications on a service account-specific basis, as described herein. Wireless communication device 10 is illustrated in greater detail in FIG. 3.

Email server 22 of FIG. 2 is a conventional email server capable of maintaining an email account for user 11 and other users. Email server 22 may be a dedicated email server or may be a server which provides email capability as part of a collaboration software package, such as Microsoft® Exchange Server, Novell® Groupwise® or Lotus® Notes for example. In the present example, email server 22 forms part of an enterprise local area network (LAN) 25 and provides email capability for employees of an enterprise, of whom user 11 is assumed to be one. The server 22 maintains an email account for user 11—referred to as "email service account A"—having an associated address "joe@work.com". As will be described, email messages received at this account are "pushed" to the wireless communication device 10 by middleware server 30 using known push technology.

Email server 24 is similar to email server 22 but is not associated with an enterprise LAN. Rather, email server 24 provides free or fee-based email service to subscribing members of the public. Server 24 maintains a separate email account for user 11—"email service account B"—having an associated address is "joe@personal.com". Email messages received at this account are redirected to the wireless communication device 10 by way of a conventional email redirection service (not expressly illustrated). The redirection service may utilize user-specified account information (e.g. email POP3 service IP addresses, account name, password, etc.) for this purpose.

IM server 26 is a conventional IM server capable of maintaining an IM account for user 11 and other users. IM server 26 may be a dedicated IM server or may be a server which provides, as part of a collaboration software package, an IM capability (e.g. IBM® Lotus™ Sametime™ or Novell® Groupwise® Messenger™). In the present embodiment, IM server 26 used for work purposes and thus forms part of the same enterprise LAN 25 as email server 22. The server 26 maintains "IM account A" for user 11. Instant messages destined for this account are "pushed" to the wireless communication device 10 by middleware server 30.

IM server 28 is a conventional IM server operated by an IM service provider, which in the present embodiment is a public IM service provider (e.g. Google Talk™, .NET Messenger Service, AOL® Instant Messenger™ (AIM), Excite® Pal, Gadu-Gadu, iChat®, ICQ®, Jabber®, Qnext™, QQ®, Skype® and Yahoo!® Messenger). It is assumed that user 11 has signed up for an IM account with this provider, and that IM server 28 maintains account information for the user (IM service account B).

Middleware server 30 supports the automatic delivery of email messages destined for email account A to wireless communication device 10 by way of the "push" content delivery model. In essence, the role of middleware server 30 is to monitor the email account A for new messages and, upon the detection of a new message at the server 30, to forward that message to wireless communication device 10 by way of the Internet 32, WAN 34, and wireless network 36. Middleware server 30 may encrypt and compress messages and perform various other tasks to fulfill this role, as is known in the art.

Wide area network 34 hosts a relay 40 whose purpose is to store messages destined for user 11 while wireless communication device 10 is inaccessible (e.g. powered down or out of communication range of wireless network 36) and to "push" the messages to the device 10 once it has become accessible. Relay 40 maintains information regarding a current network 36 with which the device 10 is communicating for this purpose. The identity of the network 36 may change over time as the wireless communication device 10 moves between geographical areas.

Wireless network 36 is a mobile data communication network, such as the Mobitex™, DataTAC™ or General Packet Radio Service (GPRS) network, which supports data communication between the relay 40 and the wireless communication device 10. Wireless network 36 may be designed to operate with any of a variety of voice communication networks, such as Advanced Mobile Phone Service (AMPS), Time Division Multiple Access (TDMA), Code Division Multiple Access (CDMA), Personal Communication Services (PCS), Global System for Mobile communication (GSM), third generation (3G) wireless or Universal Mobile Telecommunications Standard (UMTS) for example, to support voice communications at the wireless communication device 10. The wireless network 36 could alternatively be an IEEE 802.11 compliant ("WiFi") wireless network.

Figure 3:
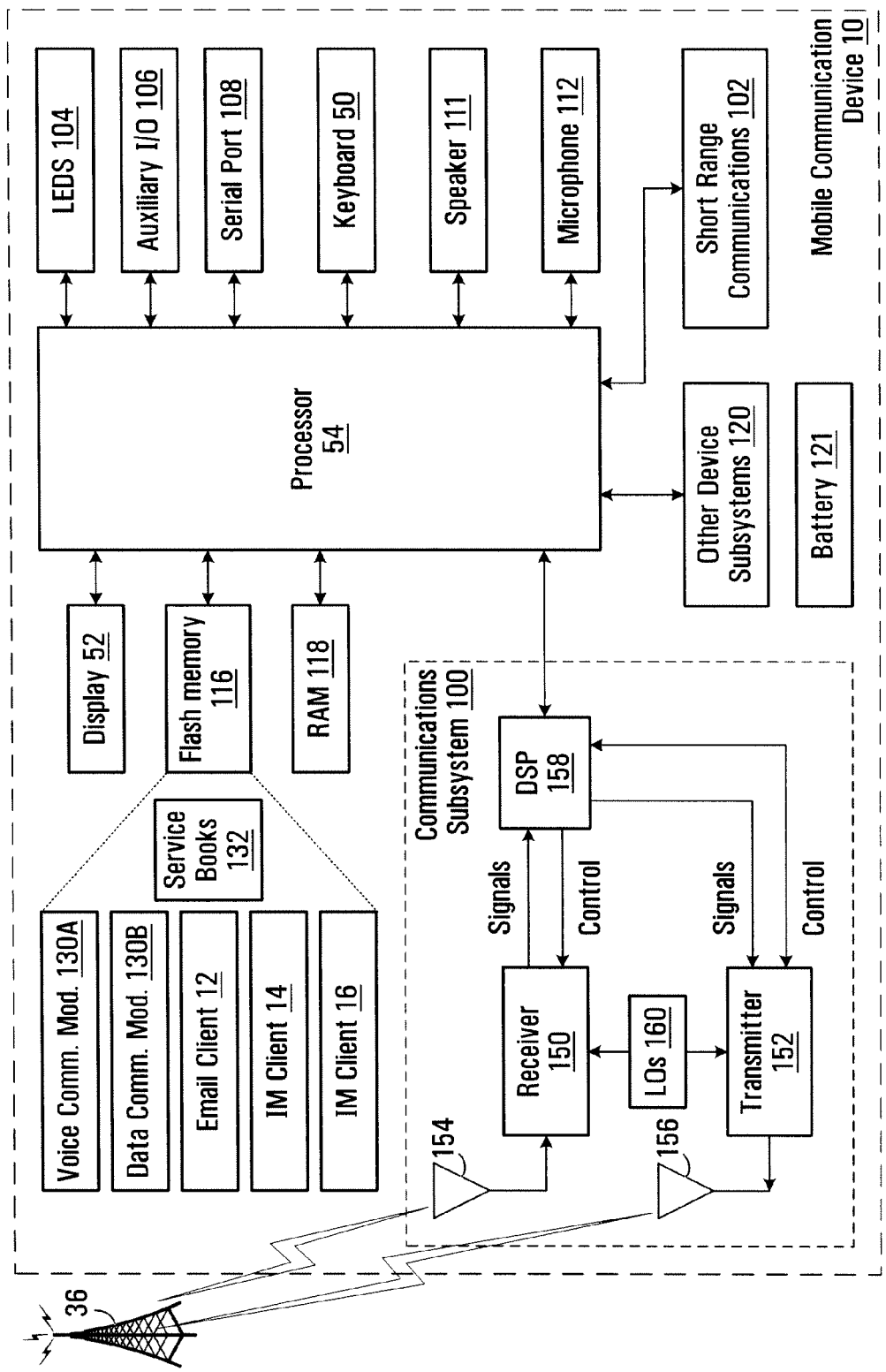
FIG. 3 is a schematic diagram illustrating the communication device of FIGS. 1 and 2 in greater detail.

Turning to FIG. 3, the hand-held wireless communication device 10 of FIG. 2 is illustrated in greater detail. The exemplary communication device 10 is a two-way pager with RF voice and data communication capabilities. In addition, the device 10 has the capability to communicate with other computer systems via the Internet 32. Device 10 including a housing, an input device, a keyboard 50, and an output device—a display 52—which may be a full graphic LCD. Other types of output devices may alternatively be utilized. A processor 54 is coupled between the keyboard 50 and the display 52. The processor 54 controls the overall operation of the device 10, including the operation of the display 52, in response to the receipt of inbound messages at device 10 and/or actuation of keys on keyboard 50 by user 11.

For completeness, various other parts of the device 10 are shown schematically in FIG. 1. These include a communications subsystem 100, a short-range communications subsystem 102, a set of auxiliary I/O devices 106, a serial port 108, a speaker 111, a microphone 112, memory devices including a flash memory 116 and a Random Access Memory (RAM) 118, various other device subsystems 120, and a battery 121 for powering the active elements of the device.

Operating system software executed by the processor 54 is stored in persistent memory, such as the flash memory 116, but may be stored in other types of memory devices, such as a read only memory (ROM) or a similar storage element, with which the processor 54 is in communication. In addition, system software, specific device applications, or parts thereof, may be temporarily loaded into a volatile memory, such as the RAM 118. Communication signals received by the device may also be stored to the RAM 118.

The processor 54, in addition to its operating system functions, enables execution of software applications (computer programs) 130A, 130B, 12, 14 and 16 on the device 10. A predetermined set of applications that control basic device operations, such as voice and data communications 130A and 130B, may be installed on the device 10 during manufacture along with the operating system. The email client 12, IM client 14 and IM client 16 may be loaded into flash memory 116 of device 10 from a machine-readable medium 38 (e.g. an optical disk or magnetic storage medium), either via wireless network 36 (e.g. by way of an over-the-air download) or directly to the device 10, by a manufacturer or provider of the device for example. The email client 12, IM client 14 and IM client 16 may be modified from a conventional form to provide a UI for conveniently configuring the device 10 to provide user notifications on a service account-specific basis, as described herein.

Flash memory 116 also stores a set of service books 132. A service book is an electronic file which contains information about a service, such as an email service, which is available to the wireless communication device 10. The information in a service book may include addressing information, service capabilities (such as compression or encryption), recognized data protocols, and the like. A service book effectively enables a specific service account at the wireless communication device 10 and governs the manner in which the device 10 communicates with the associated service. In the present embodiment, service books 132 include four service books, one namely, for facilitating access to email service account A, one for email service account B, one for IM service account A, and one for IM service account B. It will appreciated that the set of service books 132 is indicative of which service accounts are accessible to wireless communication device 10.

For the purpose of outlining the general structure and functionality of device 10, a high-level description regarding the architecture and operation of the device follows.

Communication functions, including data and voice communications, are performed by device 10 through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the device 10 is intended to operate. For example, the communication subsystem 100 of the device 10 may be designed to operate with the Mobitex™, DataTAC™ or General Packet Radio Service (GPRS) mobile data communication networks and may also be designed to operate with any of a variety of voice communication networks, such as AMPS, TDMA, CDMA, PCS, GSM, etc. Other types of data and voice networks, both separate and integrated, may also be utilized with the device 10.

Network access requirements vary depending upon the type of communication system. For example, in the Mobitex™ and DataTAC™ networks, devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the wireless communication device 10 may send and receive communication signals over the wireless network 36. Signals received from the wireless network 36 by the antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 110 are processed (e.g. modulated and encoded) by the DSP 158 and are then provided to the transmitter 152 for digital-to-analog conversion, frequency up conversion, filtering, amplification and transmission to the wireless network 36 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

The short-range communications subsystem 102 enables communication between the device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 4:
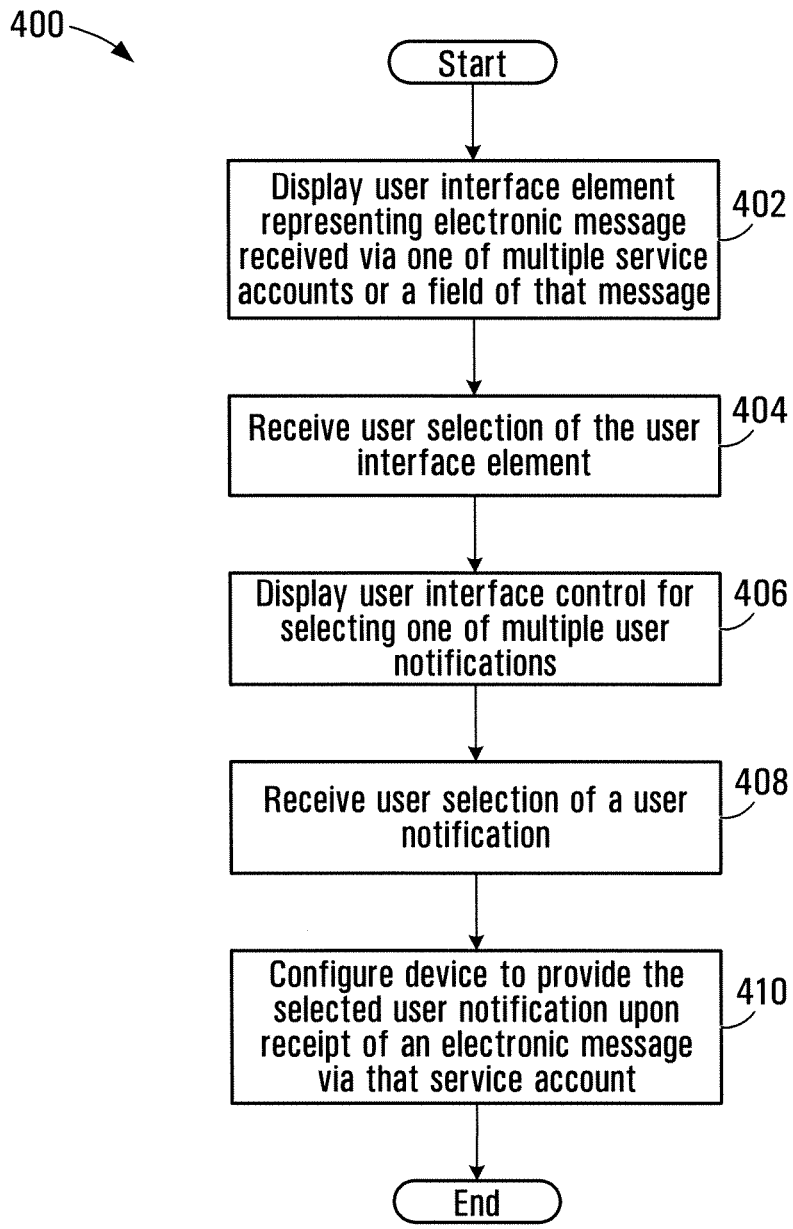
FIG. 4 is a flowchart illustrating operation of the communication device of FIGS. 1 and 2.

Operation 400 of device 10 for configuring the wireless communication device 10 to provide user notifications on a service account-specific basis is illustrated in FIG. 4. Operation 400 will be described in conjunction with FIGS. 5-10, which illustrate various exemplary user interfaces that may be displayed by device 10 during operation 400.

Figure 5:
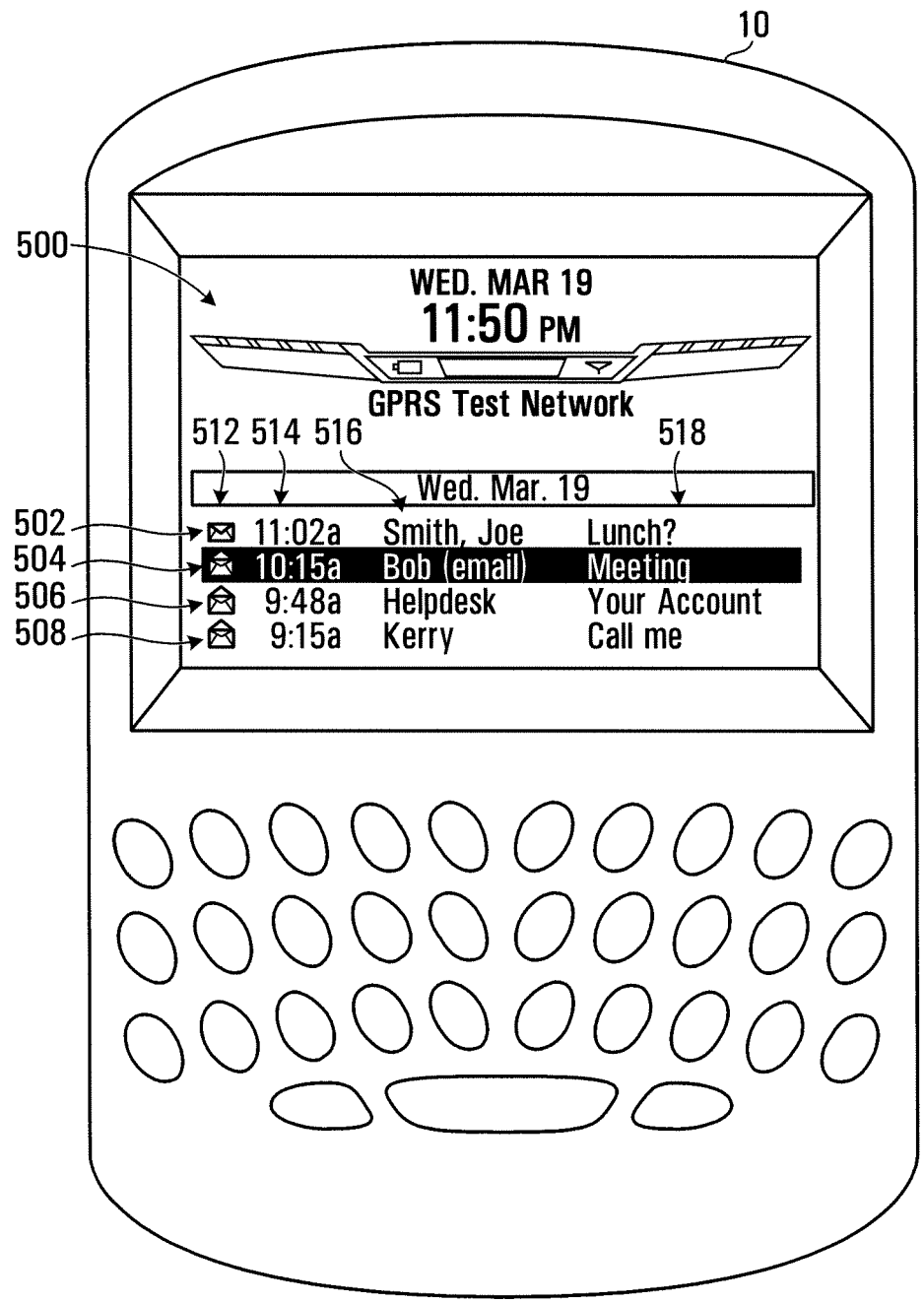
FIG. 5 illustrates a user interface of device 10 representing an email inbox.

Referring to FIG. 5, device 10, executing email client 12 (FIG. 3), initially displays a user interface 500 representing an "inbox" of email messages received at the device on its display 52 (FIG. 3). Each email message is represented by a row or entry in a list of messages. A row or entry may be referred to herein as a "message" for convenience. For example, rows

502, 504, 506 and 508 of FIG. 5 represent four distinct email messages received at device 10. Each row includes an icon indicating the message's read/unread status in a first column 512, a time of receipt in a second column 514, a sender identity in a third column 516 and a subject line in a fourth column 518, as is conventional. Messages received at device 10 via either of email service account A or email service account B are intermingled within the inbox, i.e. the list of messages represents a "unified" message list. For example, messages 502 and 508 have been received via email service account B while messages 504 and 506 have been received via email service account A. As shown in FIG. 5, messages are ordered in chronological order by time of receipt, with the most recently received messages at the top of the list in the exemplary UI 500.

Each row displayed in FIG. 5 constitutes a selectable user interface element, which represents an electronic message received via one of multiple service accounts (402, FIG. 4).

It is assumed that the user 11 of wireless communication device 10 interacts with the UI 500 to cause one of the UI elements, specifically row 504 of FIG. 5, to become selected. Selection of row 504 may be achieved through user manipulation of a pointing and/or selection device of device 10, such as a trackball, trackwheel or touchscreen for example, to effect the selection. The user may scroll to row 504 causing it to become highlighted as shown in FIG. 5 to indicate that the focus of UI 500 (i.e. the portion of the UI selected to receive input) has been set to that row, and may then depress a track wheel or track ball, for example, to effect the selection. The user selection is received (404, FIG. 4), e.g. in the form of an interrupt generated at device 10 or in the form of an invocation of a subroutine within email client 12 which is responsive to the user selection.

Figure 6:
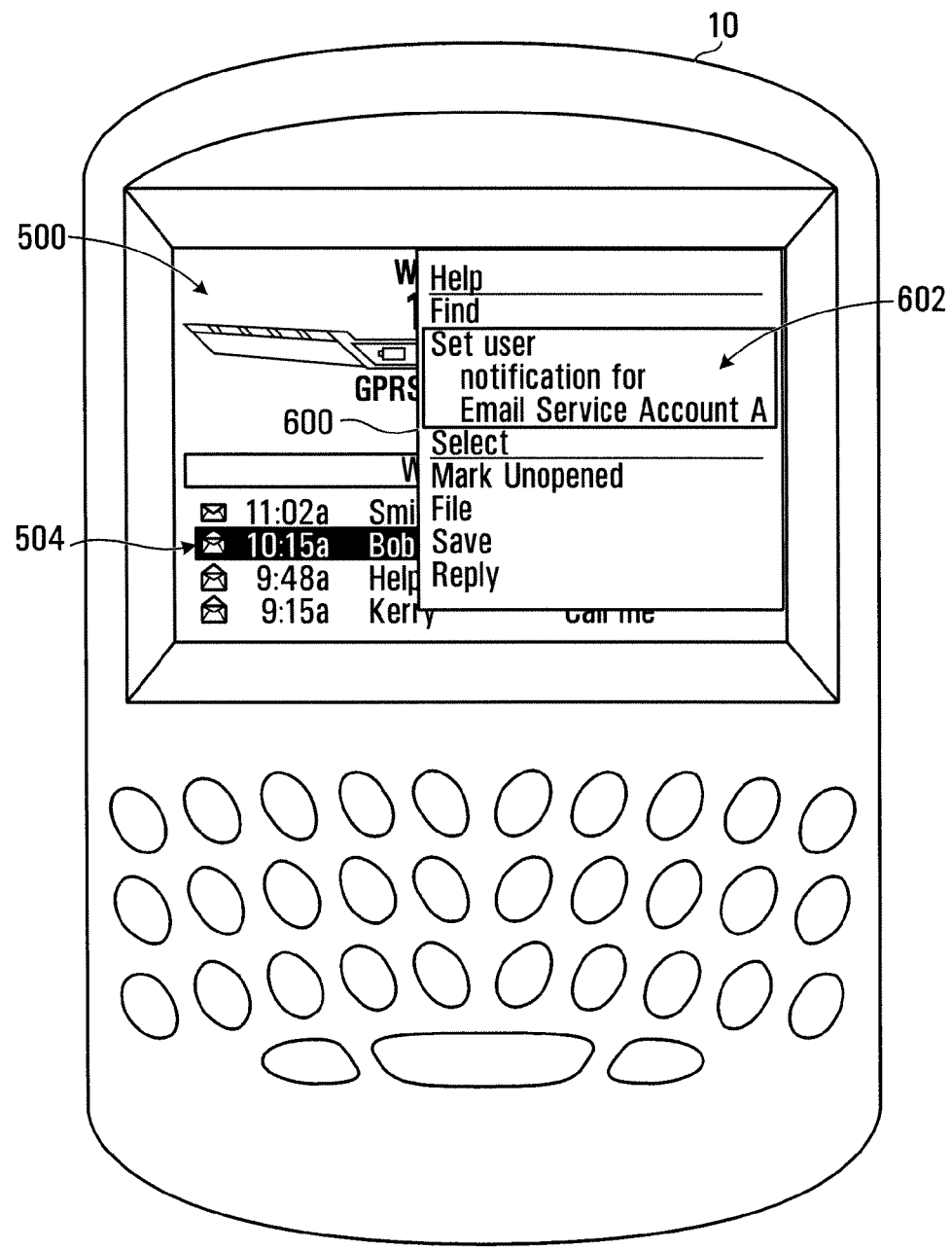
FIG. 6. illustrates the user interface of FIG. 5 after selection of a user interface element representing a received email message.

Referring to FIG. 6, the user's selection of row 504 causes a menu 600 to be displayed. The menu 600 contains a number of selectable menu items representing actions that can be taken in respect of the selected message or generally. One of the menu items 602, labelled "Set user notification for Email Service Account A", is for invoking a further UI for configuring the user notification to be provided upon receipt of an electronic message via email service account A, as will be described. It will be appreciated that this menu item 602 is context-sensitive, i.e. its presence and/or appearance within menu 600 is based at least in part upon the identity of the message (row) selected by the user 11 just prior to invocation of the menu 600. In particular, the service account identifier "Email Service Account A" that forms part of the label of menu item 602 is automatically set to form part of menu item 602 based on the account by which the selected message was received, which in the case of selected message 504 is email service account A. If message 502 had been selected instead of message 504 prior to invocation of the menu 600, the email service account identifier within menu item 602 would have instead been "Email Service Account B". If no message had been selected, the menu 600 would not have contained a menu item 602 in the present embodiment.

The identity of the email service account associated with the selected message may be determined through examination of a data structure representative of the message, as maintained by email client 12 for example. The data structure may for example contain a field indicative of the service account via which the message was received.

It should be appreciated that the exemplary identifier "Email Service Account A" within menu item 602 may instead be a different descriptor of a service account provider or account, such as "Provider.com", "My Work Email account" or "joe@work.com" (i.e. the address associated with the account) in an alternative embodiment. In some embodiments, the service account identifier may be configurable by the user. This may better promote user awareness of the identity of the service account in respect of which a user notification is being set.

By using a pointing device or other user interface control of device 10, the user 11 may scroll to the menu item 602, causing the menu item to become highlighted as shown in FIG. 6. Selection of the menu item results in the display of a further UI screen 700, which is shown in FIG. 7.

Figure 7:
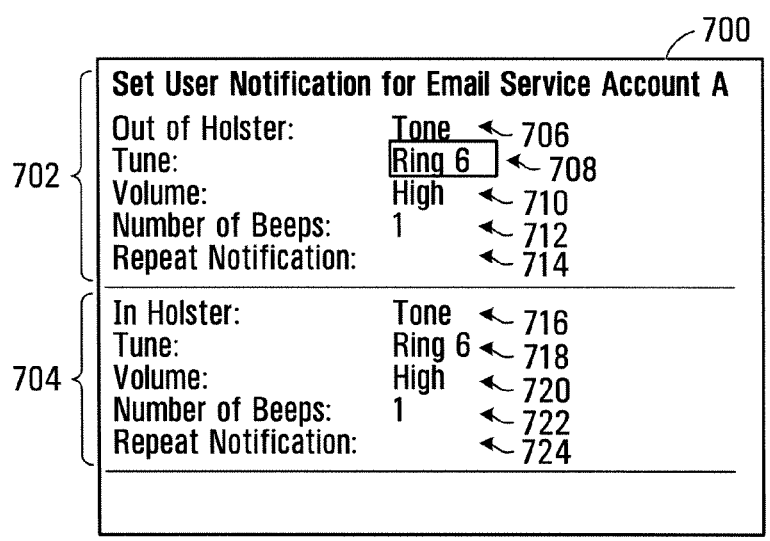
FIG. 7 illustrates a user interface for configuring service account-specific user notifications at the communication device of FIG. 1.

Referring to FIG. 7, UI screen 700 permits the user notification for email service account A to be set by the user. The exemplary UI screen 700 has a first section 702 for setting a user notification to be provided by the wireless communication device 10 upon receipt of an electronic message via email service account A while the device 10 is out of its holster and a second section 704 for setting a user notification to be provided upon receipt of an electronic message via email service account A while the device 10 is in its holster. In the present embodiment, a "holster" is a carrier or receptacle that is designed to keep the device 10 conveniently within reach when not in use. It will be appreciated that not all wireless communication devices necessarily have holsters and that the UI screen 700 may accordingly differ in alternative embodiments in that the setting of a user notification may be without regard to whether the device is in a holster.

In FIG. 7, it can be seen that section 702 includes five user interface controls 706, 708, 710, 712 and 714. These UI controls are understood to be exemplary and may vary in alternative embodiments. Each user interface control permits the user to select one option out of a number of options pertaining to the manner in which the user notification is to be provided when the device 10 is out of its holster. The user interface controls, either individually or in combination, permit selection of one of multiple user notifications (406, FIG. 4).

The user interface control field 706 (FIG. 7) permits the user to specify whether the user notification to be provided shall be "None" (i.e. no user notification), "Tone" (i.e. some sort of auditory user notification, such as a ringtone), "Vibrate" (i.e. some sort of vibration notification) or "Vibrate+Tone" (i.e. a combination of a vibration notification and an auditory notification). Alternative embodiments may further permit selection of a visual notification (e.g. a flashing screen or LED), either alone or in combination with auditory and/or tactile notifications.

The second user interface control 708, highlighted in FIG. 7, permits the user to specify which auditory notification (e.g. ringtone) is to be sounded if auditory notification has been specified by way of user interface control 706. The value "Ring 6" identifies a currently selected ringtone.

The third user interface control 710 permits the user to specify the volume of the auditory notification if auditory notification has been specified by way of user interface control 706. It may be set to the values "Mute", "Low", "Medium", "High" and "Escalating" in the illustrated embodiment.

The fourth user interface control 712 permits the user to specify the number of times that an auditory notification is to be played if auditory notification has been specified by way of user interface control 706.

The fifth user interface control 714 permits the user to specify what sort of repeat user notification is to be provided in the event that the user fails to respond to the normal or "primary" user notification (which in the illustrated example constitutes playing the "Ring 6" ringtone at high volume once, in accordance with user interface controls 706 to 712).

In the illustrated example, the user interface control 714 is blank, indicating no repeat user notification is to be provided. Possible settings for this control may include "Flashing LED", whereby an LED forming part of the device 10 is periodically flashed to indicate to the user than an electronic message received via email service account A has not yet been reviewed.

Section 704 contains five user interface controls 716, 718, 720, 722 and 724 that are analogous to controls 706, 708, 710, 712 and 714 (respectively) of section 702 but pertain to user notification when the devices 10 is in its holster rather than out of its holster. The exemplary settings of the user interface controls within section 704 in FIG. 7 are identical to those of section 702. It will be appreciated that this is not required.

When a user selection of a user notification by way of one or more user interface control(s) of FIG. 7 is received (408, FIG. 4), the device 10 is configured to provide the selected user notification upon receipt of a subsequent electronic message via email service account A (410, FIG. 4). Configuration of the device 10, may be performed in a similar manner to that in which ringtone configuration is conventionally performed when a user manually sets a ringtone for device 10, using known techniques. In one embodiment, device 10 may have a "user notification subsystem" (e.g. a "ringtones subsystem") software module which is generally responsible for keeping track of the currently configured user notifications for device 10. Applications such as email client 12 and IM clients 14 and 16 may register with this subsystem on startup as "notification event providers" based on the most recently configured user notifications set using UI 700. When an electronic message arrives, the relevant application may notify the subsystem of the arrival. The subsystem then searches for user notification "exceptions" that have been defined for the application in question. An "exception" refers to a deviation from a default, non service account-specific user notification that is provided by the device absent any user configuration using UI 700. Based on any identified exceptions, the correct user notification is provided.

Figure 8:
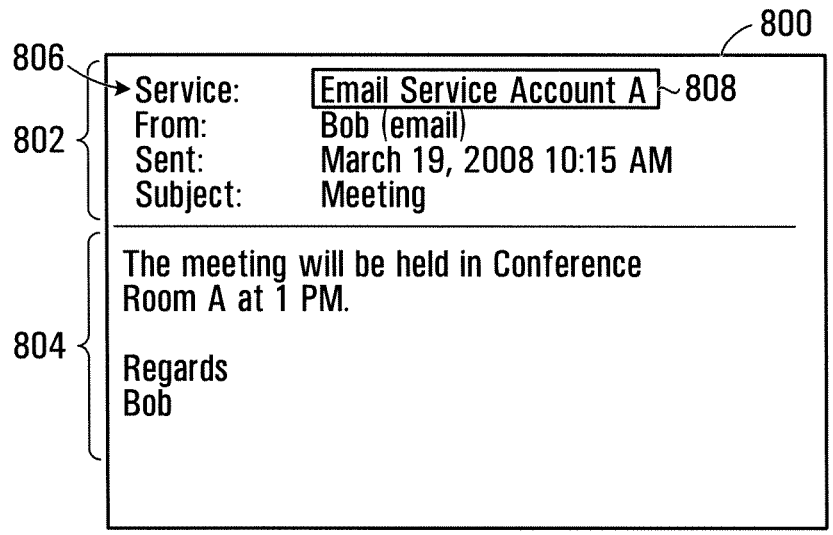
FIG. 8 illustrates a user interface of device 10 for displaying a received email message.

As indicated at 402 (FIG. 4), the UI element that is selected at 404 may represent a field of the received electronic message (rather than the electronic message generally). This is illustrated in FIG. 8. Referring to that figure, a user interface 800 for displaying an email message, namely exemplary message 504 of FIG. 5, is illustrated. As is conventional, the UI 800 has a header section 802 containing header information of the message and a body portion 804 containing a body of the message. Header section 802 contains various fields, such as "From:", "Sent:" and "Subject:" fields identifying the sender of the message, the time it was sent and the subject of the message, respectively. A field 806 (form of UI element) labelled "Service" identifies the service account via which the relevant message, message 504, was received, i.e. email service account A.

The user 11 of wireless communication device 10 may interact with the UI 800 to select UI element 806 (404, FIG. 4). Selection of UI element 806 may be achieved through user manipulation of a trackball, trackwheel or touchscreen for example, with the element 806 possibly becoming highlighted during the process as shown in FIG. 8 at 808.

Figure 9:
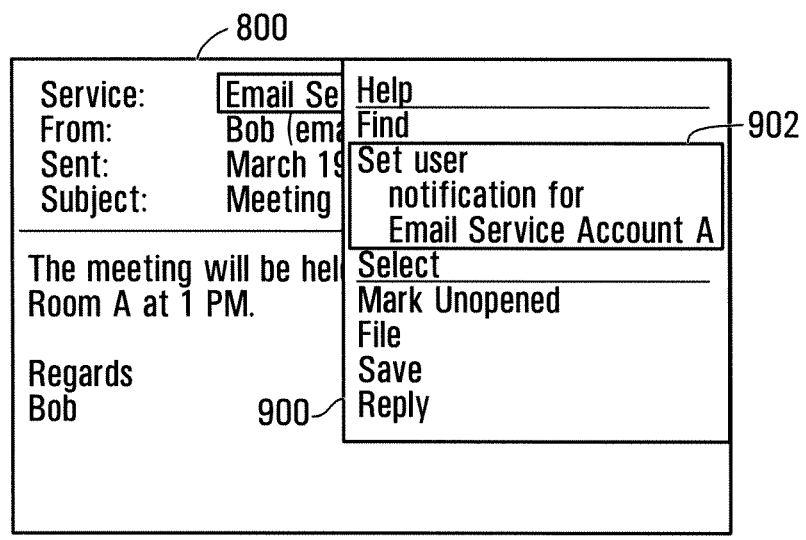
FIG. 9 illustrates the user interface of FIG. 8 after selection of a user interface element representing a field of a received email message.

Referring to FIG. 9, the selection of the UI element 806 causes a menu 900 to be displayed. The menu 900 is analogous to menu 600 of FIG. 6 and includes a menu item 902 similar to menu item 602 of FIG. 6. Selection of the menu item 902 results in the same operation that is described above as occurring upon selection of menu item 602, namely operation 406 to 410 of FIG. 4.

In some embodiments, the UI used to configure the device 10 may be designed to permit the user to easily compare and contrast the user notification settings for different service accounts. For example, in addition to displaying a first user interface control (or set of controls) permitting selection of a user notification to be provided upon receipt of an electronic message via a first service account, a number of other user interface elements, which may be similar user interface controls (or sets of controls), may also be displayed, possibly simultaneously with the first user interface control. Each of the other user interface elements may indicate, for one of the other service accounts via which electronic messages can be received at the device, what user notification is to be provided upon receipt of an electronic message via that account. The user interface elements may be user interface controls for setting these user notifications. Such a user interface is illustrated in FIG. 10.

Figure 10:
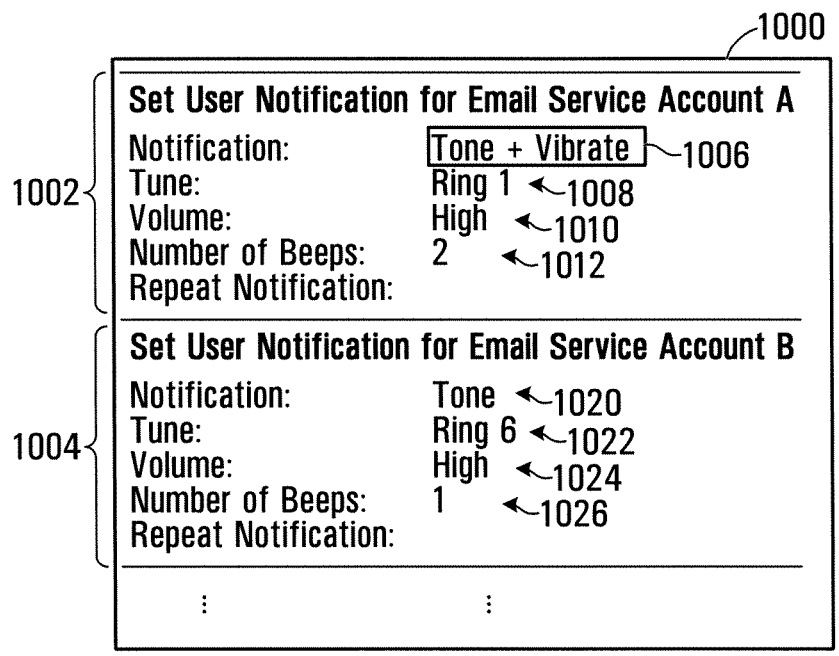
FIGS. 10 and 11 illustrate alternative user interfaces for configuring service account-specific user notifications at the communication device of FIG. 1.

Referring to FIG. 10, UI 1000 has two sections 1002 and 1004. The first section 1002 containing user interface controls 1006, 1008, 1010 and 1012 is for configuring the user notification to be provided upon receipt of electronic messages via email service account A, while the second section 1004 containing user interface controls 1020, 1022, 1024 and 1026 is for configuring the user notification to be provided upon receipt of electronic messages via email service account B. The user interface controls within these sections are similar to those shown in sections 702 and 704 of FIG. 7, except that there is no distinction as to user notifications provided when the device 10 is in its holster versus out of its holster in this example.

The identity of the service accounts represented in GUI 1000 may be determined from the set of service books 132 currently in flash memory 116. It will thus be appreciated that, if there is a change in set of service books representing service accounts whose electronic messages the device 10 is configured to receive (e.g. if the device 10 is reconfigured to access a new service account), the number of user interface controls forming part of GUI 1000 will also change accordingly.

When UI 1000 is invoked, the focus of the UI is initially set to user interface control 1006. This is evidenced in FIG. 10 by the highlighting of UI control 1006 (and the lack of any highlighting of any other user interface controls). In the present embodiment, the initial setting of the focus is based upon what message, or more accurately what UI element representing the message or what UI element representing a field of the message, was most recently selected by the user. In the present example, it is assumed that message 504 (FIG. 5), received via email service account A, is the most recently selected message.

Invocation of UI 1000 may occur in a similar manner to the invocation of UI 700 of FIG. 7 as described above. The identity of the initially highlighted user interface control in UI 1000 provides an indication to the user of the identity of the service account by which the most recently selected message was received (email service account A). The simultaneous display of the user notification settings for the other service account, email service account B, in section 1004 facilitates comparison of the settings between service accounts. The UI controls within sections 1002 and/or 1004 may be configured as desired by the user. As shown in FIG. 10, the configuration may be such that a first user notification is provided upon receipt of an email message via email account A and a second, distinct user notification is provided upon receipt of an email message via email account B. This may assist in distinguishing electronic messages received by way of different accounts.

Figure 11:
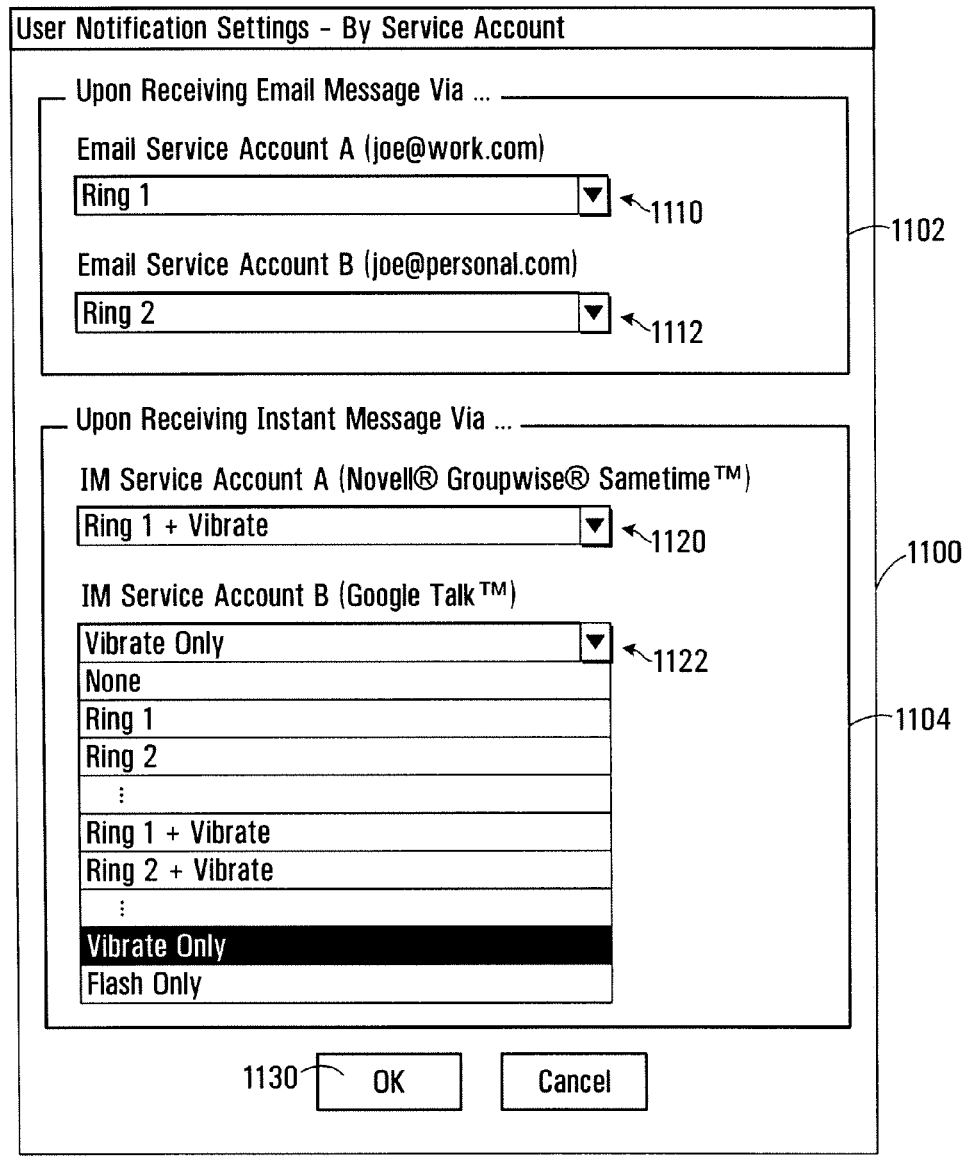

An alternative form of exemplary UI 1100 that displays user notification settings for multiple service accounts of different types (e.g. for email as well as instant messages) is shown in FIG. 11. As illustrated, UI 1100 includes, for each service account whose electronic messages the device 10 is configured to receive, a user interface control permitting selection of a user notification to be provided upon receipt of an electronic message via that service account. Specifically, GUI 1100 includes four user interface controls 1110, 1112, 1120 and 1122 for configuring user notifications to be provided upon receipt of electronic messages via email account A, email account B, IM account A and IM account B, respectively. The identity of these accounts is described textually in parentheses above each control (e.g. by a username identifier or by naming the service provider) to assist user comprehension.

User interface controls are grouped according to service type. Thus, all of the user interface controls 1110, 1112 pertaining to email service accounts are presented in a section 1102, while all of the controls 1120, 1122 pertaining to IM service accounts are presented in another section 1104. In the present embodiment, unlike the earlier illustrated embodiment, each user interface control is a drop-down list having a plurality of independently selectable entries, each representing a potential user notification that the device 10 is capable of providing. Selection of an entry determines the user notification to be provided when an electronic message is received via the corresponding service account. For example, user interface control 1122 is shown in a dropped-down state with one of the entries, "Vibrate only", being selected (selection being indicated by reverse-video). This represents a user selection of the "Vibrate only" notification to be provided upon receipt of an instant message via IM service account B. As shown in the dropped down list, the user notifications includes auditory notifications (ringtones), vibration notifications, visual notifications ("flash"), and combinations of these. It will be appreciated that user interface controls other than drop-down lists (e.g. radio buttons, combo boxes, etc.) could be used in alternative embodiments to select user notifications.

Based on the settings shown in GUI 1100, therefore, it should be apparent that the device 10 has been configured to provide the following user notifications upon receipt of inbound electronic messages from the following service accounts:

TABLE 1

User Notifications by Service Account

| Service Account | User Notification |
|---|---|
| Email account A | Ring 1 |
| Email account B | Ring 2 |
| IM account A | Ring 1 + Vibrate |
| IM account B | Vibrate Only |

The use of the "Ring 1" user notification for each of email account A and IM account A may be intended to indicate the (anticipated) work-related nature of messages received these accounts. The "+vibrate" feature (i.e. vibrating in addition to sounding auditory ringtone "Ring 1") may be for distinguishing a work-related email message from a work-related instant message. Various other user notifications settings are possible.

Selection of the "OK" button 1130 of the illustrated embodiment indicates that configuration of the service-account specific user notifications is complete. This causes the settings to be saved in memory at the device 10 for future use in determining which user notification is to be provided upon the receipt of an electronic message at the device. The settings could be stored in various ways, e.g. as records or structures; within a database; in binary form or textually; and so forth. The settings for example could be stored in a separate store of ringtone information, with each entity in the store containing a ringtone as well as a reference to each service book entry (e.g. by a unique id of the service book entry) with which it is currently associated.

Figure 12:
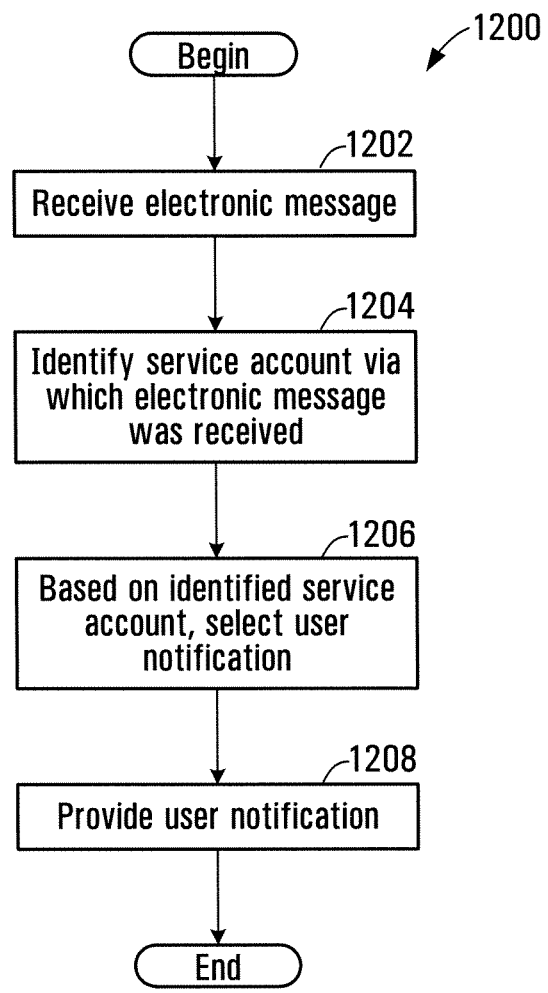
FIG. 12 illustrates operation of the device of FIG. 1 in providing a user notification.

Operation 1200 of the wireless communication device 10 in applying the user-configured user notifications to notify the user of a received electronic message is illustrated in FIG. 12. Initially, an electronic message is received at the device 10 (1202). The message is received via one of the four above-noted service accounts. For example, an email message addressed to "joe@work.com" received at email server 22 (FIG. 2) may be forwarded to the device 10 by middleware server 30, by way of Internet 32, WAN 34, and wireless network 36, in a conventional manner. Alternatively, an email message addressed to "joe@personal.com" received at email server 24 may be redirected to the device 10 by a conventional email redirection service. An instant message to an enterprise IM service account A may be received at IM server 26 and forwarded to the middleware server 30 then on to the device 10 via the relay 40. An instant message to a public IM service account B may be received at IM server 28 and forwarded to the device 10 via relay 40, or in some cases, may bypass the IM server 28 and be sent directly to the device 10.

Subsequently, the service account via which the electronic message was received is identified (1204, FIG. 12). Identification may involve examining the received message for an indication of the receiving service account. The location and format of this information within the received message or message header may be system-dependent and/or dependent upon the underlying communication protocol(s) used to communicate the message. In the case of an email message, the location and format of service account information may already be known to the email client application 12 as it may already be used to provide an indication of the receiving service account when the message is displayed at the device 10 (e.g. a "Service: <account>", "Received From: <account>" or "Using: <account>" field may form part of the displayed header of the email message as in FIG. 8). In the case of an instant message, the service account may be identifiable from the unique addressing (e.g. message header fields) used to communicate the message to the device 10 such that it is associated with the correct service book and is received by the appropriate one of IM client 14 and IM client 16.

Thereafter, based on the identified service account, a user notification is selected (1206, FIG. 12). Selection is performed based on the user notification settings earlier saved at the device 10 using GUI 700, 1000 or 1100 for example.

Finally, the user notification is provided to the user (1208, FIG. 12). Depending upon the type of user notification, this may involve activation of speaker 111 of FIG. 3 (for auditory notifications), display 52 or LEDs 104 (for visual notifications), and/or a vibrator component (not shown—for vibration notifications). Operation 1200 is thus completed.

As will be appreciated by those skilled in the art, various modifications can be made to the above-described embodiments. For example, although UIs 700, 1000 and 1100 are each illustrated as a single UI screen in FIGS. 7, 10 and 11, respectively, it should be appreciated that each UI could take the form of multiple screens (e.g. a "wizard" format) in alternative embodiments. This may be necessitated by size limitations of display 52 of device 10.

It should also be appreciated that the user interfaces for configuring service account-specific user notifications need not be graphical. They may, e.g., be exclusively textual UIs.

It will also be appreciated that, although the above-described embodiment was described as receiving messages only via email and IM service accounts, some embodiments may permit configuration of the user notification to be provided upon the receive of other types of electronic messages via other types of service accounts. For example, a communication device could alternatively or additionally be configured to receive telephone calls placed to two different telephone numbers—a work number and a personal number—administered by one or more service providers. In that case, each telephone number may be considered to be a distinct service account. If both telephone numbers have associated Short Message Service (SMS) or Multimedia Message Service (MMS) capability, the device could receive SMS or MMS messages via either one of the two different service accounts. In such a scenario, the device may be configurable to provide a different user notification upon receipt of a message via the first service account (e.g. a text message sent to the work number) than is provided upon receipt of a message via the second service account (e.g. a text message sent to the personal number).

The functionality for configuring service account-specific user notifications need not form part of a software application that is specific to handling or displaying a type of received message, such as an email client or IM client. It may instead form part of a configuration utility or of the operating system of device 10 for example.

To the extent that received messages are displayed in a unified message list as in FIG. 5, the list could intermingle messages of different types (E.g. email and SMS).

As should be evident from FIGS. 7, 10 and 11, the number of user interface controls that are provided for the purpose of configuring a user notification to be provided upon receipt of an electronic message via a particular service account may be one (as in FIG. 11) or more (as in FIGS. 7 and 10). Various types of user interface controls, such as drop down lists, combo boxes, radio buttons, or others, may be used to select a user notification of multiple user notifications.

Wireless communication device 10 need not be a two-way paging device in all embodiments. Other forms of wireless communication devices, such as handheld computers, personal digital assistants, cellular telephones, or smart phones, to name but a few examples, could alternatively be used.

Other modifications will be apparent to those skilled in the art and, therefore, the invention is defined in the claims.

What is claimed is:

1. A method of configuring an electronic device capable of receiving electronic messages via a plurality of service accounts, comprising:
displaying a user interface element representing an electronic message received via a service account of said plurality of service accounts;
based at least in part upon user selection of the user interface element representing the received electronic message, displaying at least one user interface control for selecting from among a plurality of user notifications for the service account; and
upon user selection, via the at least one user interface control, of one of the plurality of user notifications, configuring said electronic device to provide the selected user notification as a service-account specific user notification upon receipt of any subsequent electronic message via said service account.

2. The method of claim 1 further comprising displaying, in addition to said at least one user interface control, at least one further user interface element indicative of a user notification to be provided upon receipt of a subsequent electronic message via another one of said plurality of service accounts.

3. The method of claim 2 wherein said at least one further user interface element comprises at least one further user interface control for facilitating user selection of the user notification to be provided upon receipt of said subsequent electronic message via said other one of said plurality of service accounts.

4. The method of claim 3 wherein said at least one user interface control and at least one further user interface control are simultaneously displayed and further comprising setting device focus upon or highlighting said user interface control but not said at least one said further user interface control based upon said user selection of the user interface element.

5. The method of claim 1 wherein said plurality of service accounts is a plurality of electronic mail (email) message accounts, a plurality of instant message accounts, a plurality of telephony service accounts having Short Messaging Service (SMS) capability, or a plurality of telephony service accounts having Multimedia Messaging Service (MMS) capability.

6. The method of claim 1 wherein said user notification is one or more of a visual notification, an audible notification, and a vibration notification.

7. The method of claim 1 wherein said displaying of the user interface element comprises displaying a list containing said user interface element, the list also containing another displayed user interface element representing another electronic message received via a different service account of said plurality of service accounts, wherein the displayed list lacks any displayed indicators of the service accounts by which the electronic messages represented by the displayed user interface elements were received.

8. A machine-readable medium storing instructions which, when executed by a processor of an electronic device capable of receiving electronic messages via a plurality of service accounts, cause said electronic device to:
display a user interface element representing an electronic message received via a service account of said plurality of service accounts; and
based at least in part upon user selection of the user interface element representing the received electronic message, displaying at least one user interface control for selecting from among a plurality of user notifications for the service account; and
upon user selection, via the at least one user interface control, of one of the plurality of user notifications, configure said electronic device to provide the selected user notification as a service-account specific user notification upon receipt of any subsequent electronic message via said service account.

9. The machine-readable medium of claim 8 wherein said instructions further cause said electronic device to display, in addition to said at least one user interface control, at least one further user interface element indicative of a user notification to be provided upon receipt of a subsequent electronic message via another one of said plurality of service accounts.

10. The machine-readable medium of claim 9 wherein said at least one further user interface element comprises at least one further user interface control for facilitating user selection of the user notification to be provided upon receipt of said subsequent electronic message via said other one of said plurality of service accounts.

11. The machine-readable medium of claim 10 wherein said at least one user interface control and at least one further user interface control are simultaneously displayed and wherein said instructions further cause a setting of device focus upon or highlighting of said user interface control but not said at least one said further user interface control based upon said user selection of the user interface element.

12. The machine-readable medium of claim 8 wherein said displaying of the user interface element comprises displaying a list containing said user interface element, the list also containing another displayed user interface element representing another electronic message received via a different service account of said plurality of service accounts, wherein the displayed list lacks any displayed indicators of the service accounts by which the electronic messages represented by the displayed user interface elements were received.

13. An electronic device capable of receiving electronic messages via a plurality of service accounts, said electronic device comprising a processor and memory in communication with said processor, said memory storing instructions which, when executed by said processor, cause said electronic device to:

display a user interface element representing an electronic message received via a service account of said plurality of service accounts; and based at least in part upon user selection of the user interface element representing the received electronic message, displaying at least one user interface control for selecting from among a plurality of user notifications for the service account; and upon user selection, via the at least one user interface control, of one of the plurality of user notifications, configure said electronic device to provide the selected user notification as a service-account specific user notification upon receipt of any subsequent electronic message via said service account.

14. The electronic device of claim 13 wherein said instructions further cause said electronic device to display, in addition to said at least one user interface control, at least one further user interface element indicative of a user notification to be provided upon receipt of a subsequent electronic message via another one of said plurality of service accounts.

15. The electronic device of claim 14 wherein said at least one further user interface element comprises at least one further user interface control for facilitating user selection of the user notification to be provided upon receipt of said subsequent electronic message via said other one of said plurality of service accounts.

16. The electronic device of claim 15 wherein said at least one user interface control and at least one further user interface control are simultaneously displayed and wherein said instructions further cause a setting of device focus upon or highlighting of said user interface control but not said at least one said further user interface control based upon said user selection of the user interface element.

17. The electronic device of claim 13 wherein said displaying of the user interface element comprises displaying a list containing said user interface element, the list also containing another displayed user interface element representing another electronic message received via a different service account of said plurality of service accounts, wherein the displayed list lacks any displayed indicators of the service accounts by which the electronic messages represented by the displayed user interface elements were received.

* * * * *